Patented May 6, 1930

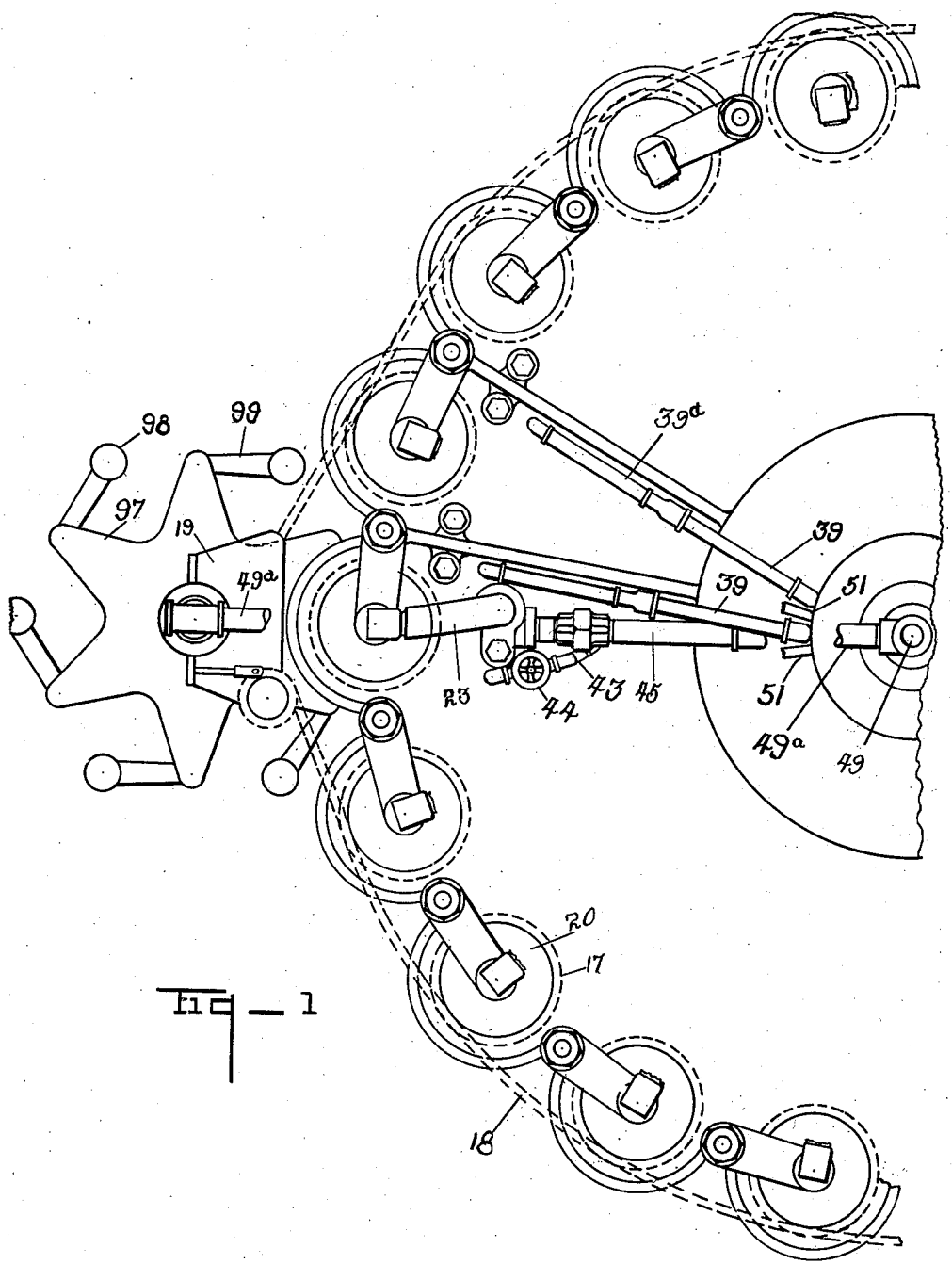

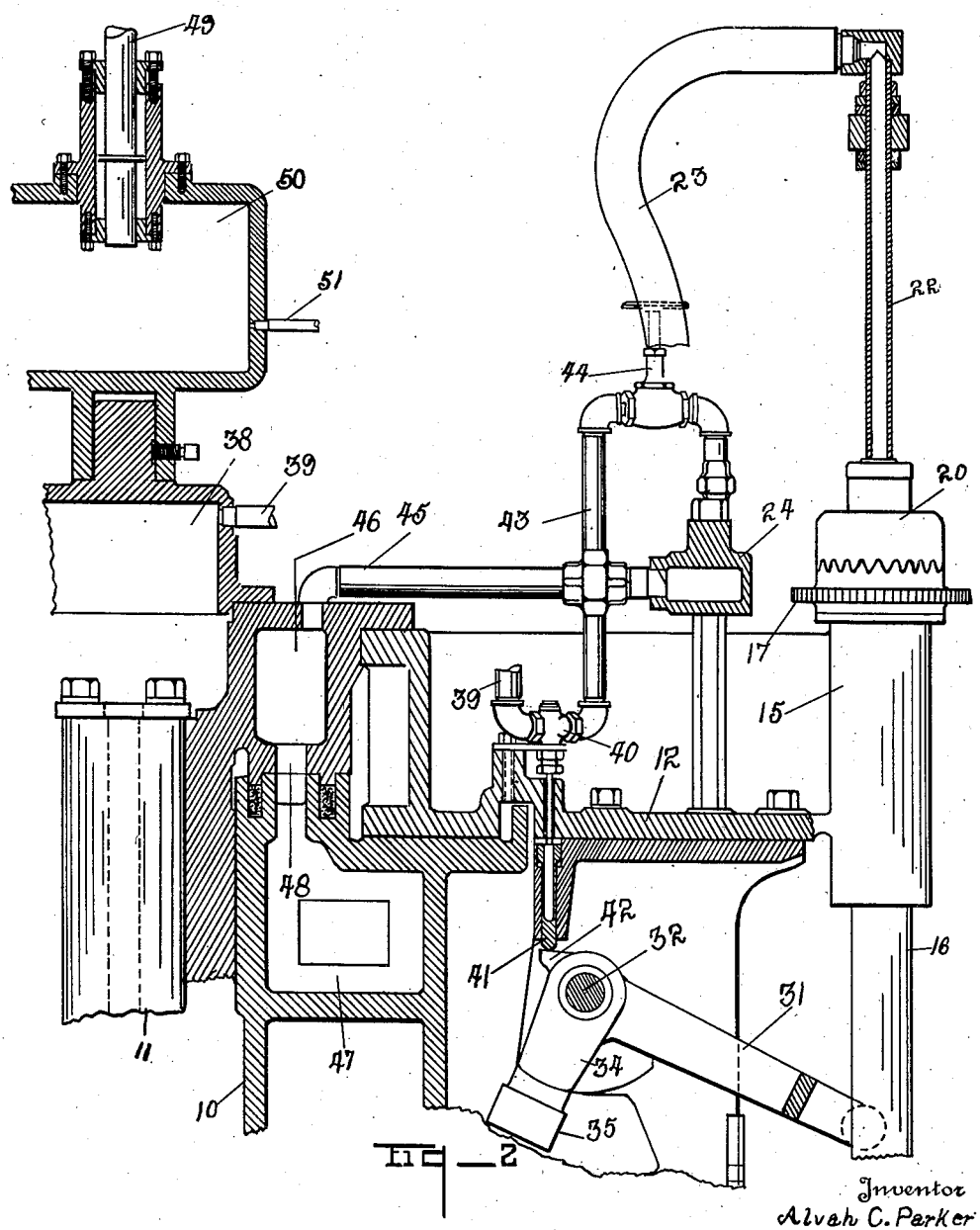

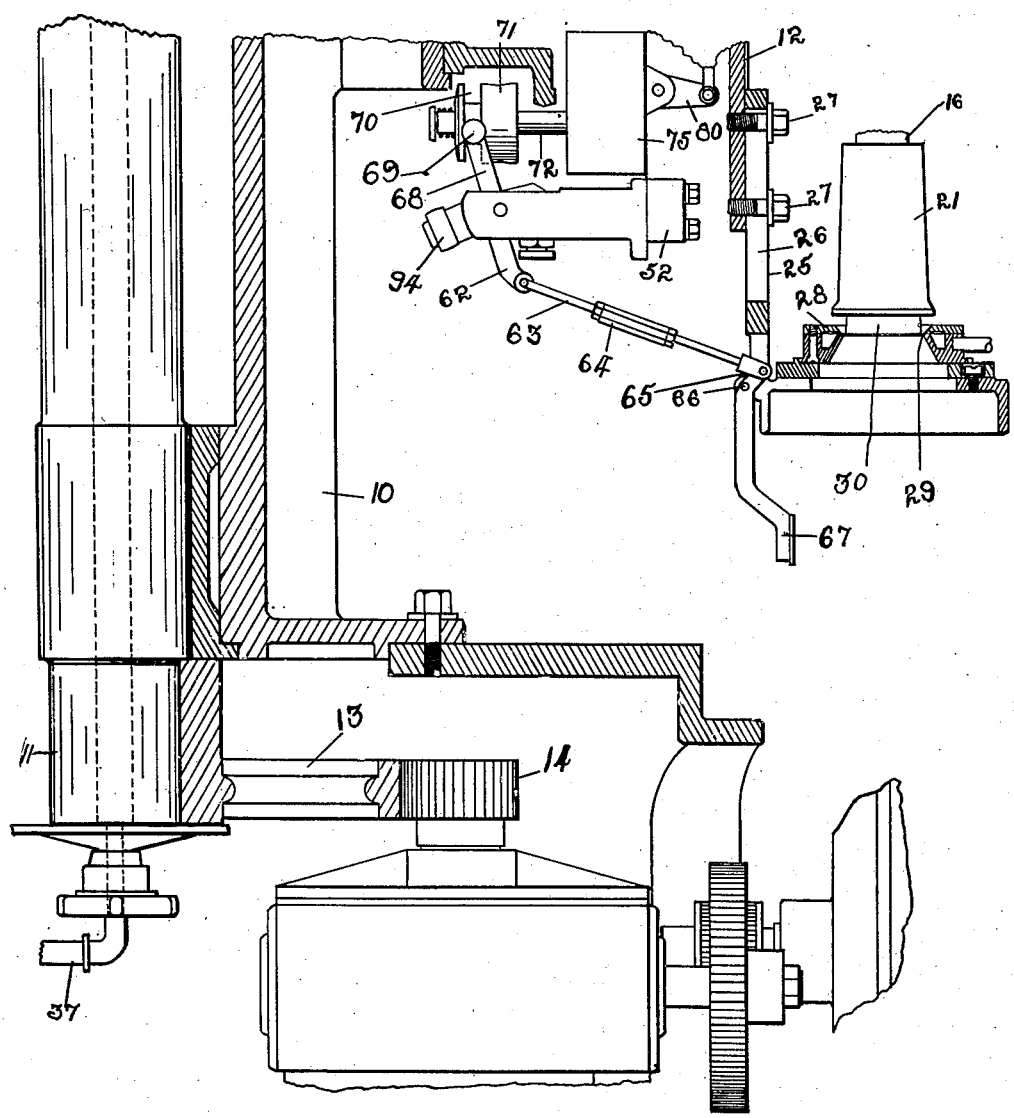

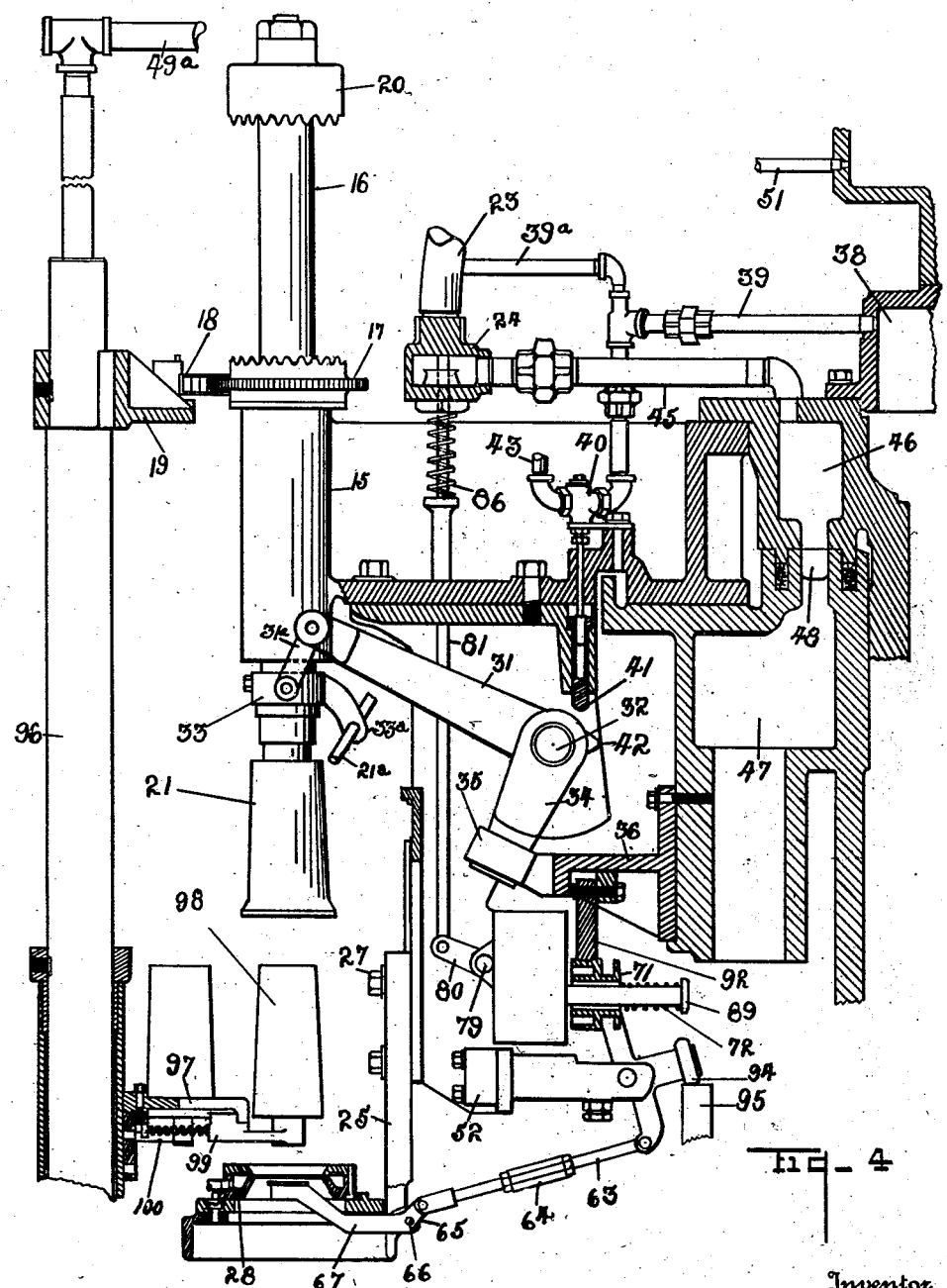

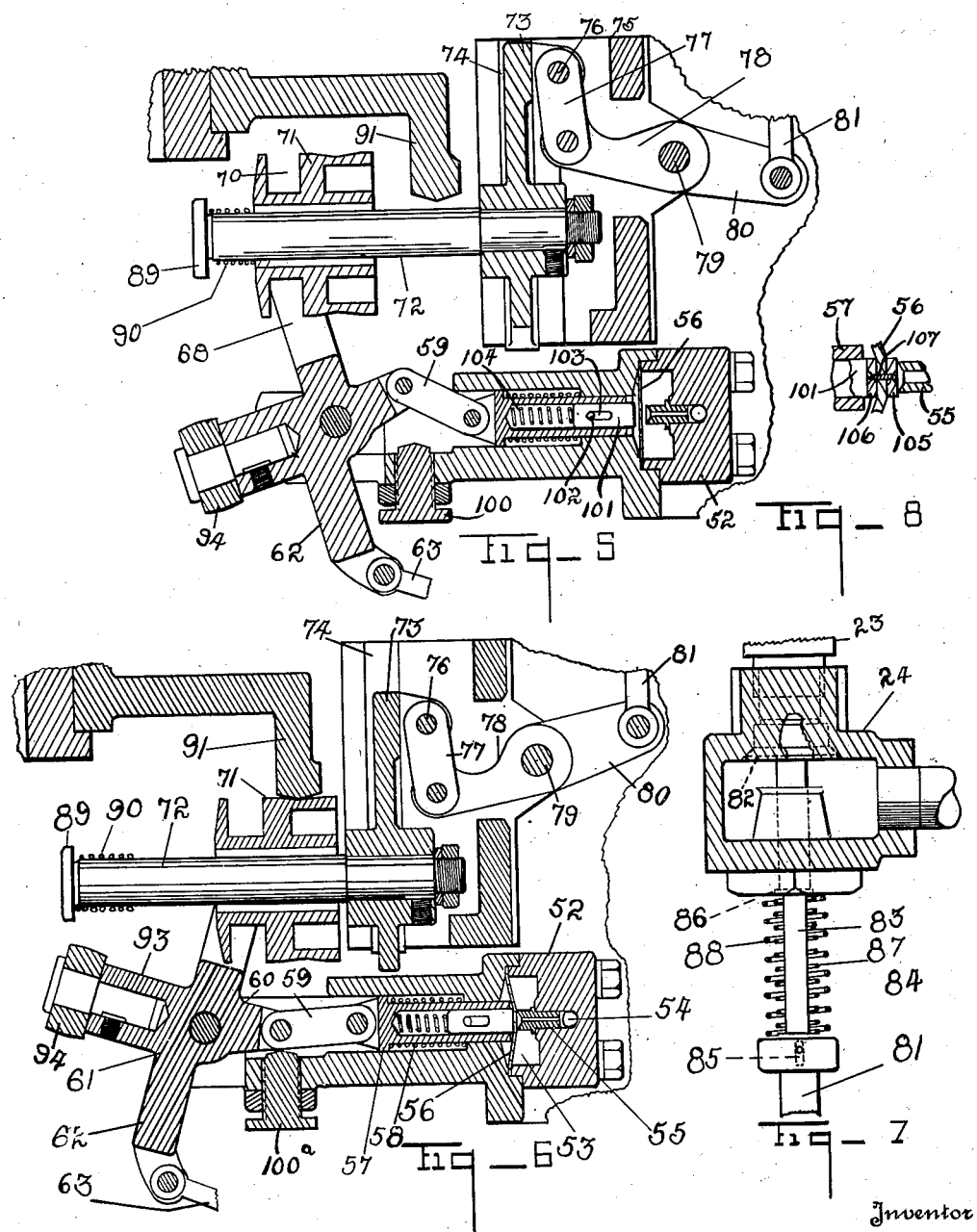

1,757,211

UNITED STATES PATENT OFFICE

ALVAH C. PARKER, OF TOLEDO, OHIO, ASSIGNOR TO THE LIBBEY GLASS MANUFACTURING COMPANY, A CORPORATION OF OHIO

ROTARY BURN-OFF MACHINE

Application filed October 24, 1928. Serial No. 314,558.

This invention relates to improvements in devices for severing glass by burning it off and more particularly to devices in which the glass and burner travel in a circular path while the burning off is being accomplished.

An important feature of the invention relates to the control of vacuum, gas and oxygen employed in the operation. The details and other important features of the invention will appear as the description proceeds.

In the accompanying drawings forming a part of this specification, Figure 1 is a somewhat diagrammatic plan view of a portion of the apparatus; Fig. 2 is a vertical section through the upper part of one side of the apparatus with parts in burning off position; Fig. 3 is a section similar to Fig. 2 but showing the lower part of the apparatus; Fig. 4 is a partial vertical section of the apparatus showing the devices in discharging position; Figs. 5 and 6 are detail views showing part of the oxygen and vacuum controlling devices in two positions; Fig. 7 is a detail of the vacuum valve; Fig. 8 is a detail of the oxygen valve.

The device is mounted upon a central drum 10, which may be supported in any desired manner. Through the central portion of the drum there is an upright hollow drive shaft 11, the upper end of which drives a carrier member 12. Around the lower end of shaft 11 there is a gear 13 meshing with a gear 14 driven in any desired manner from a motor or other suitable source of power. Supported about the carrier 12 there is a series of vertical bearings 15 in which there are mounted sleeves 16. Mounted loosely about each sleeve 16 above bearing 15 there is a drive gear 17 engaged by a chain 18 which passes about the machine and engages all of the gears 17 except the one shown in the middle of Fig. 1. The ends of the chain are attached to a stationary member 19, so that the gears 17 are rotated as the carrier is turned with respect to the chain.

On the upper end of each sleeve 16 there is a collar 20 having teeth on its lower side adapted to mesh with similar teeth on the upper side of gear 17. At the lower end of each sleeve there is a chuck 21. In the device disclosed, this chuck is operated by vacuum, and the vacuum pipe 22 extending upward through the sleeve is connected at its upper end to a hose 23 which leads to a valve casing 24.

Beneath each chuck there is a burner bracket 25 having a vertical slot 26 therein through which bolts 27 pass into the lower portion of carrier 12. A burner 28 is mounted upon the bracket, and in the construction shown, has an annular slot 29 adapted to direct an annular flame towards an article, such as a tumbler 30, supported in the chuck.

A lever 31 is fulcrumed at 32 on carrier 12 and is connected by a link, 31ª, to a collar 33 in which sleeve 16 may rotate, but which is fixed against longitudinal movement with respect to sleeve 16. Lever 31 has an arm 34 carrying a cam wheel 35 adapted at certain times to contact with a cam 36 (see Fig. 4) to raise the chuck when desired.

A gas pipe 37 has a swivel connection with the bottom of the passage through hollow shaft 11, and a gas chamber 38 mounted at the upper end of said hollow shaft. A series of pipes 39 radiate from chamber 38, one for each burner. Each pipe 39 leads to a valve chamber 40. The valve in this chamber is controlled by an actuating stem 41 which in turn is movable by a lug 42 extending from lever 31. A pipe 43 leads from valve chamber 40 to the respective burner, there being preferably a hand controlled valve 44 in pipe 43.

Each vacuum valve casing 24 is connected by a pipe 45 to a chamber 46 in carrier 12. A chamber 47 in drum 10 is connected by passages 48 with chamber 46 in carrier 12. Chamber 47 is evacuated by any suitable means.

In the construction shown, a stationary oxygen pipe 49 leads into the center of a chamber 50 mounted upon chamber 38. A series of pipes 51 radiate from chamber 50, one for each burner. Each pipe 51 leads to a valve casing 52. Within valve casing 52 there is an entrance chamber 53 and an exit chamber 54, from which there is a pipe, not shown, leading to the respective burner. Between chambers 53 and 54 there is a pipe 55 having a bell-shaped mouth directed towards a diaphragm 56. A plug 57 is provided for actuating the diaphragm. A spring 58 around plug 57 normally moves the plug to inactive position so that the diaphragm is in the position in which it is shown in Fig. 5, at which time the passage between chambers 53 and 54 is opened.

Member 57 is connected by a link 59 to an arm 60 of a multi-armed oscillating member 61. Member 61 has a lower arm 62 to which there is connected a link 63 provided with an adjusting turn buckle 64. Link 63 is connected to a short arm 65 of a trip member pivoted at 66 on bracket 25. The long arm 67 of the trip member is adapted to oscillate to and from a position immediately beneath the burner.

Member 61 is provided with an upwardly extending forked arm 68 bearing in the upper ends of the fork pins 69 adapted to enter a groove 70 in a wheel 71 slidably mounted upon a stem 72. Stem 72 projects from a slide 73 movable vertically in a slideway 74 in a bracket 75 mounted on carrier 12. A pin 76 on slide 73 is connected by a link 77 to an arm 78 of a lever fulcrumed on pin 79. Another arm 80 of the lever is connected to a valve operating rod 81. The vacuum valve 82 has a valve stem 83 movable longitudinally in a socket in the end of rod 81. A pin 84 passes through the end of rod 81 and through a slot 85 in stem 83, limiting the relative movement between rod 81 and stem 83. Stem 83 is provided with a shoulder 86, and a spring 87 mounted between the end of rod 81 and shoulder 86 normally maintains the valve stem and valve at the upward limit of movement allowed by slot 85. A comparatively strong spring 88 between valve casing 74 and the end of rod 81 normally depresses the rod and through the intermediate mechanism raises slide 73 to the upper limit of its travel.

Pin 72 is provided with a head 89, and a spring 90 between head 89 and wheel 71 cushions the outward movement of the wheel. A cam 91 is mounted upon an extension from central drum 10, and positioned at the point where it will be passed by wheel 71 at the time burning off is taking place during the normal operation of the mechanism. Another cam 92, also mounted upon drum 10 in a suitable manner, is located in the position where the article is discharged during the normal operation of the machine.

Member 61 has a cam arm 93 on which there is mounted a wheel 94 in position to contact a cam 95 suitably mounted upon the stationary drum at a point where the chuck is normally raised after a burning off operation.

In the construction shown, there is a vertical mast 96 supporting the member 19 to which the ends of chain 18 are attached. Mast 96 may also be used as a support for member 49$^a$, which acts as a holder for pipe 49.

Mounted about mast 96 there is a take off device, which in the form shown, comprises a star wheel 97. A tumbler receiving member 98 is mounted upon an arm 99 pivoted to swing from each point of the star wheel. A spring 100 normally maintains arm 99 in its outward position. Star wheel 97 is rotated by any suitable mechanism so that in normal operation the receivers move successively beneath successive chucks.

The operation of the mechanism described above is as follows:

While the chuck is maintained in its upward position by cam 36, as shown in Fig. 4, a tumbler having a moil attached thereto is inserted in the chuck. The chuck is operated so that vacuum is applied when the tumbler is inserted, and the tumbler is thereby held in position. Such vacuum chucks are well known and need not be described in detail.

After a tumbler has been inserted in the chuck, cam 36 allows the chuck to be lowered until the moil passes through the burner and the desired line of severance is in position to be contacted by the annular flame of the burner.

When the chuck begins to lower the trip is in the position in which it is shown in Fig. 4. As will be readily seen by an inspection of Fig. 6, the parts are so arranged that link 59 and arm 60 form a toggle which is prevented by spring 58 from permitting the outward movement of wheel 71 until this toggle is broken. If the chuck contains a tumbler with a moil attached thereto, when the chuck is lowered the moil contacts the trip and moves it downward enough to break the above said toggle, whereupon the trip is moved to the position in which it is shown in Fig. 3, and the toggle and associated parts are moved to the position in which they are shown in Fig. 5. This movement of the parts releases diaphragm 56 from the end of pipe 55 and allows the passage of oxygen through this valve to the burner.

The swinging of lever 31 to lower the chuck brings lug 42 into contact with valve 41 and turns on the gas in the burner. The parts may be so arranged that there is a continuous supply of gas sufficient to form a pilot light in each burner, or a pilot light may be positioned adjacent the path of the burners so that the flame is lit at the time the gas valve is opened.

The opening of the gas valve is dependent in the apparatus shown only upon the lowering of the chuck, so that gas is turned on to the burner regardless of whether or not there is any tumbler in the chuck. But, if for any reason a chuck is not supplied with a tumbler, when the chuck is lowered there is nothing to contact trip 67 and, therefore, wheel 71 remains in the position in which it is shown in Fig. 6 and, therefore, is depressed by cam 91. This depression of wheel 71 by cam 91 results in the raising of rod 81 and the closing of the vacuum pipe, so that there is no needless exhaustion through the chuck in the absence of an article therein. If the vacuum were still connected to the chuck while it was lowered towards the flame and there was no article in the chuck, the flame might be drawn into the interior of the chuck with undesirable results.

While the mechanism is rotating from the position in which the chuck is lowered towards the position in which the chuck is next raised, flame from the annular burner impinges upon the article along the desired line of severance. When the chuck is lowered member 20 on the upper end of sleeve 16 engages with gear 17 and so causes the rotation of the chuck during the time that it is lowered. Thus the article is rotated within the annular flame which results in an even application of heat all around the article. The result is that glass along the line impinged by the flame is quickly melted and the moil drops off. After the moil has dropped off, wheel 35 engages cam 36 and the chuck is raised to the position in which it is shown in Fig. 4. At about the same time wheel 94 rides onto cam 95 and returns the trip to the position in which these parts are shown in Figs. 4 and 6. After the chuck is raised it is brought into registration with one of the receiving members 98 in the manner described above and at the same time wheel 71 is depressed by cam 92 and through the actuating devices previously described, the vacuum valve is closed. If desired, additional means may be provided for actuating the chuck at this time to discharge the tumbler.

The yielding mounting of members 98 prevents the breakage of the arms when, for any reason, an article drops prematurely or where there is other interference with the proper registration of the receiver with the chuck.

It will be readily seen that the burner bracket is vertically adjustable so as to provide for burning off articles of different lengths, and carrier 97 is adjustable about mast 96 so that suitable receivers 98 may be positioned beneath the chuck and above the burner. If a shorter article is to be burned off, the burner may be raised and carrier 97 may be raised likewise, with the application of shorter members 98, is necessary.

It will be noted that wheel 17 of the chuck which is in registry with a receiving member 98, is not engaged by chain 18. Wheel 17 revolves loosely about sleeve 16, so that the chuck might be stationary at this point even though wheel 17 were being revolved, but by allowing wheel 17 to be stopped at this time there is no tendency to continue the revolution of the chuck by friction at the time the tumbler is being dropped.

The force holding trip 67 raised and which must be overcome before the trip is forced down and the oxygen valve is opened, depends upon how much the toggle formed by members 59 and 60 is bent when the trip is raised. This may be adjusted by a set screw 100$^a$ upon which link 59 rests at that time, as shown in Fig. 6.

For nice operation of the oxygen valve, member 57 may be formed as a casing in which there slides a plunger 101 having relative longitudinal movement limited by a pin 102 and slot 103, and normally pressed to the limit of that movement towards the diaphragm by a spring 104. This gives the plunger a yielding contact with the diaphragm.

In order to avoid excessive wear on the diaphragm, it may be armored on its opposite sides by washers 105 and 106 united by a rivet or screw 107, as shown in Fig. 8.

In order to maintain the chuck at proper working temperature, a chuck-heating burner 21$^a$ may be held in proper position by a bracket 33$^a$ on collar 33, or by other suitable means. This burner may be supplied with gas by suitable connections to a branch 39$^a$ of pipe 39, or it may be supplied by a branch from pipe 43, if preferred.

It will be seen from the above that a very simple construction has been devised which results in the automatic turning on of the gas at the time it is needed for burning off operations and which results in the supplying of oxygen at the same time when there is an article in the chuck needing to be burned off, but which does not supply the oxygen in the absence of such article, and furthermore, closes the vacuum valve when the chuck is lowered without an article therein.

Various changes may be made in the mechanism shown and described within the scope of the appended claims.

What I claim is:

1. In apparatus for treating glass articles, a burner, a chuck, a supply valve for the burner, means for bringing the chuck and burner into operative relation to apply a flame from the burner to an article in the chuck and means for opening said valve when the chuck and burner are brought into said operative relation, the actuation of the last said means being dependent upon the presence of an article in the chuck.

2. In apparatus for severing glassware, a chuck adapted to hold a glass article, a burner adapted to apply a severing flame to an article in the chuck, means for producing relative movement between the chuck and burner to bring an article in the chuck into proper relation with a flame from the burner, a supply valve for the burner, and means to open the supply valve, the last said means being operable by an article in the chuck when the burner and chuck are brought into cooperative relation.

3. In apparatus of the character described, a rotary chuck adapted to hold a glass article suspended therefrom, a burner beneath the chuck, means for producing relative vertical movement between the chuck and burner to bring an article in the chuck into proper relation with the burner, a supply valve for the burner, and means operable by an article in the chuck when the burner and chuck are brought towards each other, to open the supply valve.

4. In apparatus of the character described, a rotary chuck adapted to hold a glass article, a burner in line with the chuck, a trip on the other side of the burner from the chuck, a supply valve for the burner, means for bringing the chuck and burner towards each other to place an article in the chuck in cooperative position with relation to the burner, and connections between said trip and said valve operable to open the valve when the trip is engaged by an article in the chuck.

5. Apparatus of the character described, comprising a chuck adapted to hold a glass article, a burner, means to produce relative movement between the chuck and burner to position an article in the chuck to receive a flame from the burner at a proper point thereon, means for constantly supplying fuel gas to the burner whenever the chuck and burner are in proper cooperative relation, an oxygen supply valve for the burner, and means for opening the last said valve when the burner and chuck are brought into proper cooperative relation, the last said means being dependent upon the presence of an article in the chuck.

6. Apparatus of the character described comprising a chuck adapted to hold a glass article, a burner, means to produce relative movement between the chuck and burner to position an article in the chuck to receive a flame from the burner at a proper point thereon, means for constantly supplying fuel gas to the burner whenever the chuck and burner are in proper cooperative relation, an oxygen supply valve for the burner, and a trip for opening the valve, said trip being in the path of the article as the burner and chuck are brought into proper cooperative relation.

7. In apparatus of the character described, a chuck adapted to hold a glass article, a burner, means to bring the chuck and burner into proper cooperative relation to apply a flame from the burner to an article in the chuck, a fuel gas supply valve for the burner, automatic means for opening said supply valve when the chuck and burner are brought into proper cooperative relation, an oxygen supply valve for the burner and means operative by an article in the chuck for opening the oxygen supply valve when the chuck and burner are brought into proper cooperative relation.

8. In apparatus of the character described, a chuck for holding a glass article, a burner, means for bringing the chuck and burner into proper cooperative relation to apply a flame from the burner to an article in the chuck, two supply valves for the burner, automatic means operable by the movement of the chuck and burner into cooperative relation to open one of said supply valves and automatic means operable by an article in the chuck for opening the other supply valve when the chuck and burner are brought into cooperative relation.

9. Apparatus of the character described, comprising a rotary chuck adapted to hold a glass article, a substantially annular burner in line with the chuck, means for producing relative movement of the chuck and burner along the axial line of the chuck, two supply valves for the burner, automatic connections opening one of said supply valves when the chuck and burner are moved towards each other, a trip on the side of the burner away from the chuck and connections between the trip and the other supply valve for opening said other supply valve when the trip is operated by an article thrust through the burner.

10. In apparatus of the character described, a vacuum chuck, an exhaust pipe connected to said chuck, a valve in said pipe, a burner, means for moving the chuck and burner towards each other, automatic means for closing the valve in the exhaust pipe when the chuck and burner are moved towards each other, and means, operable by an article in the burner, preventing the operation of said automatic means when there is an article in the burner.

11. In apparatus of the character described, a burner, a vacuum chuck above the burner adapted to hold a glass article, an exhaust pipe connected to the chuck, a valve in said pipe, means to produce relative vertical movement between the chuck and burner, and automatic means for closing said valve when the chuck and burner are moved towards each other without an article in the chuck.

12. Apparatus of the character described, comprising a burner, a supply valve for the burner, a vacuum chuck, an exhaust pipe connected to the chuck, a valve in said pipe, means for moving the chuck and burner towards each other, automatic means for opening said supply valve when the chuck and burner are moved towards each other, and automatic means for closing the valve in the exhaust pipe when the burner and chuck are moved towards each other without an article in the chuck.

13. Apparatus of the character described, comprising a burner, a supply valve for the burner, a vacuum chuck, an exhaust pipe connected to the chuck, a valve in said pipe, means for moving the chuck and burner towards each other, automatic means for opening said supply valve when the chuck and burner are moved towards each other, automatic means for closing the valve in the exhaust pipe when the burner and chuck are moved towards each other without an article in the chuck, a trip in the path of an article held in the chuck when the burner and chuck are moved towards each other, and connections from the trip preventing the closing of the valve in the exhaust pipe when the trip is actuated by an article in the chuck.

14. In apparatus of the character described, a rotary carrier, an annular series of bearings supported on the carrier, a vertically reciprocable sleeve in each of said bearings, a chuck carried by said sleeve and adapted to support a glass article, a gear loosely mounted on said sleeve and resting on the top of the bearing, a collar fixed to the sleeve, means on the collar and the gear engaging them for simultaneous rotation when the collar is moved into engagement with the gear, a chain surrounding the series of gears and a fixed support for the ends of the chain at one side of the path of the gears.

15. In apparatus of the character described, a rotary carrier, an annular series of bearings supported on the carrier, a vertically reciprocable sleeve in each of said bearings, a chuck carried by said sleeve and adapted to support a glass article, a gear loosely mounted on said sleeve and resting on the top of the bearing, a collar fixed to the sleeve, means on the collar and the gear engaging them for simultaneous rotation when the collar is moved into engagement with the gear, a chain surrounding the series of gears, a fixed support for the ends of the chain at one side of the path of the gears, and means for releasing articles from each successive chuck while the gear associated therewith is passing the ends of the chain and is out of engagement with the chain.

16. In apparatus of the character described, an annular series of burners, a chuck vertically reciprocable above each burner, a take-off device at one side of the annular series of burners and having a plurality of arms each adapted to enter between a burner and chuck when the chuck is raised and means for rotating said burners, chucks and take-off arms in unison so that the take-off arms register in succession between successive chucks and burners.

17. In apparatus of the character described, an annular series of burners, a chuck vertically reciprocable above each burner, a take-off device at one side of the annular series of burners and having a plurality of arms each adapted to enter between a burner and chuck when the chuck is raised and means for rotating said burners, chucks and take-off arms in unison so that the take-off arms register in succession between successive chucks and burners, said take-off arms being yieldably mounted to allow their rotation without breakage when their entrance between a chuck and burner is obstructed.

18. In apparatus of the character described, an annular series of burners, a chuck vertically reciprocable above each burner, a take-off device at one side of the annular series of burners and having a plurality of arms each adapted to enter between a burner and chuck when the chuck is raised and means for rotating said burners, chucks and take-off arms in unison so that the take-off arms register in succession between successive chucks and burners, said burners and said take-off arms being vertically adjustable to accommodate different lengths of articles.

19. In apparatus of the character described, a burner having a supply valve and a trip associated with the burner and in the path of an article moved into cooperative relation with the burner, and connections between the trip and supply valve for opening the valve when the trip is moved by an article.

20. In apparatus of the character described, an annular series of annular burners, the axes of the burners being vertical, a rotatable vacuum chuck vertically reciprocable above each burner and in axial alinement therewith, means for revolving said burners and chucks about the axis of the series, means for rotating the chucks about their several axes, means for reciprocating the chucks towards and from the burners, an exhaust pipe connected with each chuck, a valve governing each exhaust pipe, two supply valves for each burner, means for automatically opening one of said supply valves when the associated chuck is lowered to cooperative relation with the associated burner, a trip beneath each burner, connections between the trip and the other supply valve of the associated burner to open said valve when the trip is pressed downward by an article in a chuck and means closing the valve in the exhaust pipe upon the lowering of the chuck when the trip is not actuated by an article, a take-off device having arms adapted to enter in succession between successive chucks and burners when the chucks are raised and automatic means for closing the valve in the exhaust pipe when the associated chuck is in registry with the take-off device.

In testimony whereof, I have hereunto signed my name to this specification.

ALVAH C. PARKER.